United States Patent Office 2,837,546
Patented June 3, 1958

2,837,546

STYRENATED OILS

Joseph Nichols, Princeton, N. J., assignor to Ethicon, Inc., a corporation of New Jersey No Drawing. Application October 25, 1954
Serial No. 464,656

12 Claims. (Cl. 260—407)

This invention relates to the styrenation of ketonized castor oil, and particularly relates to the styrenation of oxidized castor oil in which the hydroxy groups of the glycerol ricinoleates thereof have been converted to keto groups by oxidative means.

Castor oil is a tri-glyceride oil in which 88 to 93 percent of the fatty acid component is ricinoleic acid and 7 to 12 percent consists of oleic, stearic, linoleic, and dihydroxy stearic acid. The ricinoleic acid component has a beta-gamma unsaturated alcohol group. Co-pending application Serial Number 443,165, filed July 13, 1954, describes a method for the ketonization of castor oil by oxidation of the glycerol ricinoleates by means of an aluminum secondary or tertiary alkoxide in the presence of a hydrogen acceptor such as a low molecular weight ketone, the oxidation being conducted in an organic solvent. The oxidation results in the production of a ketonized castor oil in which the fatty acid moities contain a double bond positioned alpha-beta or beta-gamma with respect to the keto group.

Styrenization of drying oils has been practiced for some time and styrenated oils have assumed a prominent role in the surface coating field. Differences among oils such as the degree of conjugation and of polymerization, and the extent of oxidation, have been recognized as influencing the final properties of the product. Various oils such as soybean oil, linseed oil, tung oil, and dehydrated castor oil as well as modified drying oils such as heat bodied, isomerized, blown, and isomerized-blown oils, and raw and alkali refined oils, have been styrenated. However, only a comparative few of the styrenated oils heretofore produced have provided clear films; the majority of the styrenated oils formed heterogenous cloudy, opaque, or frosty films. Styrenation of dehydrated castor oil, an oil containing conjugation, has been reported to yield an opalescent product and styrenation of partially polymerized, dehydrated castor oil yielded a clear, fast-drying product; Journal of the Americal Oil Chemical Society, volume 28; page 496 (1951).

It is an object of this invention to provide a styrenated, ketonized castor oil, and more particularly, to provide a styrenated, ketonized castor oil in which the hydroxy groups of the glycerol ricinoleates present in the castor oil have been converted to keto groups by oxidative means.

It is another object of this invention to provide a styrenated, ketonized castor oil having the ability to form clear, fast-drying films.

The objects of this invention are accomplished and a styrenated, ketonized castor oil provided by the styrenation of castor oil in which the hydroxy groups of the glycerol ricinoleates thereof have been converted to keto groups by oxidative means, and more specifically by oxidation in an organic solvent with an aluminum secondary or tertiary alkoxide in the presence of a hydrogen acceptor such as a low molecular weight ketone.

In general, in the method of this invention for the styrenation of ketonized castor oil, approximately equal weights of styrene and ketonized castor oil are dissolved in an aromatic organic solvent and the mixture is refluxed. Organic peroxides may be added as catalysts and organic peroxides such as benzoyl peroxide, cumene hydroperoxide, and tertiary-butyl hydroperoxide, are particularly satisfactory. It is preferred that approximately equal weights of styrene and ketonized castor oil be employed, but variations in the proportion of styrene and oil also result in a styrenated, ketonized castor oil providing clear, fast-drying films.

In general, the method by which castor oil is oxidized to convert the hydroxy groups of glycerol ricinoleates present in the castor oil, to keto groups is as follows:

A quantity of castor oil is dissolved in a large excess of an organic solvent which is inert with respect to the oxidizing agent, and preferably an aromatic hydrocarbon such as xylene, toluene, or benzene and an excess of a low molecular weight aliphatic ketone such as acetone, methyl ethyl ketone, or cyclohexanone, precautions being taken to ensure that the solution is anhydrous. An excess of aluminum secondary or tertiary alkoxide in which the alkyl group is of low molecular weight, and preferably aluminum isopropoxide, or aluminum tertiary butoxide, is dissolved in an anhydrous organic solvent, and preferably an aromatic hydrocarbon such as xylene, toluene, or benzene and added to the solution of the acid. The reaction mixture is heated and refluxed, and precautions are taken to exclude moisture during heating and refluxing. Refluxing the reaction mixture for a period of time of from five to about fifteen minutes at a temperature not substantially above 115° C. results in a ketonized castor oil in which the fatty acid moities contain a double bond positioned predominantly in the beta-gamma position with respect to the keto group. If the time of refluxing is less than about five minutes, a substantial amount of unoxidized castor oil is recovered unchanged; and if the refluxing time exceeds about fifteen minutes, a ketonized oil containing a substantial amount of glycerides of 12-keto-10-octadecenoic acid as well as glycerides of 12-keto oleic acid is obtained. Refluxing the reaction mixture for a period of time substantially longer than fifteen minutes results in a ketonized castor oil in which the double bond of the fatty acid moities has been shifted to the alpha-beta position with respect to the keto group. As the time of refluxing is increased the amount of shifting of the double bond is increased and shifting of the double bond is still further increased by elevating the reflux temperature. Ketonized castor oil in which the double bond of the fatty acid moities is predominantly positioned alpha-beta with respect to the keto group is obtained by refluxing of the reaction mixture for at least about 45 minutes when the reflux temperature is not substantially above 115° C. For the preparation of ketonized castor oil in which the double bond of the fatty acid moities is predominantly positioned beta-gamma with respect to the keto group, it is preferred that the reflux temperature be 110°–115° C. and the time of refluxing ten to fifteen minutes. And for the preparation of ketonized castor oil in which the double bond of the fatty acid moities is predominantly positioned alpha-beta with respect to the keto group, it is preferred that the reflux temperature be 126°–130° C. and the time of refluxing one to six hours.

At the end of the reflux period, the reaction mixture is cooled and washed several times with dilute mineral acid. The washings are combined, extracted with an organic solvent, and preferably an aromatic hydrocarbon such as xylene, benzene, or toluene, and the solution is washed with water until the pH of the wash water is approximately neutral. The solution of the reaction product is dried over a drying agent, the drying agent is removed, and the organic solvent is removed by distillation under reduced pressure. The residual oil may be further purified by washing with aqueous ethanol.

Ketonized castor oils containing predominately glycerides of 12-keto-10-octadecenoic acid, glycerides of 12-keto oleic acid, or mixtures thereof, as well as bodied ketonized castor oils containing predominately glycerides of 12-keto-10-octadecenoic acid, glycerides of 12-keto oleic acid, or mixtures thereof may be styrenated according to the method of this invention and the resulting styrenated oils are useful as protective coatings, or may be used with fillers and other polymeric substances as protective coatings.

For the purpose of illustration, the following examples of the styrenation of ketonized castor oil are set forth:

Example I

Ketonized castor oil was prepared in the following manner:

180 grams of castor oil, 1800 milliliters of toluene and 900 milliliters of cyclohexanone in a 5-liter, 3-neck flask fitted with a mechanical stirrer, thermometer, Dean-Stark water trap, and reflux condenser, were heated to reflux and maintained at a reflux until water was no longer evolved. A solution of 180 grams of aluminum tertiary-butoxide dissolved in 900 milliliters of anhydrous toluene was rapidly added to the solution of castor oil in toluene and cyclohexanone. The reaction mixture was refluxed for fifteen minutes and then rapidly cooled with an ice-water mixture. The cooled reaction mixture was successively washed with five 500 milliliter portions of ten percent sulphuric acid, and then washed with water until the pH was approximately 7.0, and dried over anhydrous sodium sulfate. The organic solvents were removed from the reaction mixture by distillation at a pressure of 0.3 millimeter of mercury. When the temperature of the reaction product reached 65° C. the distillation was discontinued. The residual oil was dissolved in 700 milliliters of ethanol and precipitated by the addition of 180 milliliters of water. The precipitation was repeated an additional four times, using the same amounts of ethanol and water, and the final precipitated oil was dissolved in petroleum ether and dried over anhydrous sodium sulfate. The petroleum ether was removed by distillation at a pressure of 0.3 millimeter of mercury and, when the temperature of the residual liquid reached 65° C., distillation was discontinued. 140 grams of light yellow oil having a viscosity of 1.10 poises at 25° C. were obtained. The oil had an acid number of 0.40, 86.4 percent of the theoretical number of keto groups for glycerol tri-12-keto oleate, and a refractive index at 27° C. of 1.4763.

20 grams of redistilled styrene, 20 grams of the ketonized castor oil prepared as above, 40 grams of xylene and one gram of benzoyl peroxide were stirred and heated at a reflux temperature for sixteen hours, the reflux temperature being 105° C. All of the styrene had reacted with the oil at the end of the reflux period. The reaction mixture containing the styrenated oil deposited a clear, tacky film which became tack-free after standing for 24 hours.

Example II

Ketonized castor oil was prepared as follows:

One hundred grams of castor oil were dissolved in a solution of one liter of toluene and one liter of cyclohexanone and the solution was heated with stirring to reflux and maintained at a reflux temperature until water was no longer evolved. A solution of 200 grams of aluminum isopropoxide in two liters of anhydrous toluene was rapidly added to the solution of castor oil in toluene and cyclohexanone. The reaction mixture was refluxed for five minutes, the reflux temperature being 114° C., and then rapidly cooled with an ice-water mixture. The cooled reaction mixture was successively washed with five 250 milliliter portions of ten percent sulfuric acid, and then washed with water until the pH was about 7.0 and dried over anhydrous sodium sulfate. The organic solvents were removed from the reaction mixture by distillation at a pressure of 0.3 millimeter of mercury and the distillation was discontinued when the temperature of the distillate reached 65° C. After washing the residual oil with an aqueous alcohol solution, 78 grams of a light yellow oil having an acid number of 1.0, a refractive index at 25° C. of 1.4769, and 80.2 percent of the theoretical number of keto groups for glycerol tri-12-keto oleate were obtained.

The ketonized castor oil obtained by the above procedure was air-blown for eleven days.

20 grams of redistilled styrene, 20 grams of air-blown ketonized castor oil obtained according to the above procedure, 40 grams of xylene, and one gram of benzoyl peroxide were heated with stirring at a reflux temperature for sixteen hours, the reflux temperature being 105° C. All of the styrene had reacted with the oil at the end of the reflux period. The reaction product formed a clear, tacky film which became tack-free on standing for 24 hours.

Example III

Ketonized castor oil was prepared as follows:

180 grams of castor oil, 1800 milliliters of xylene, and 900 milliliters of cyclohexanone in a 5-liter, 3-neck flask fitted with a mechanical stirrer, thermometer, Dean-Stark water trap and reflux condenser were heated to reflux and maintained at a reflux until water was no longer evolved. A hot solution of 180 grams of aluminum tertiary butoxide dissolved in 900 milliliters of xylene was slowly added to the hot solution of castor oil in xylene and cyclohexanone. The reaction mixture was refluxed for one hour and then cooled. The cooled reaction mixture was successively washed with five 500 milliliter portions of ten percent sulphuric acid and then washed with water until the pH of the wash water was 7, and dried over anhydrous sodium sulfate. The organic solvents were removed from the reaction mixture by distillation at a pressure of 0.3 millimeter of mercury. When the temperature of the residual oil reached 185° C. the distillation was discontinued. The residual oil was dissolved in 450 milliliters of absolute ethanol, filtered, cooled in an ice bath for five hours and filtered. The yellow crystalline solid obtained was recrystallized from 150 milliliters of absolute ethanol. 50 grams of glycerol tri-12-keto-10 octadecenoate were obtained. The crystalline acid had a melting point of 46–47° C., an acid number of 0.231, and 95.2 percent of the theoretical number of keto groups for glycerol tri-12-keto-10-octadecenoate. The crystalline acid was recrystallized five times from absolute ethanol and then had a melting point of 49–50° C., an acid number of 0.0, and 100 percent of the theoretical number of keto groups for glycerol tri-12-keto-10-octadecenoate.

20 grams of redistilled styrene, 20 grams of the crystalline, ketonized castor oil obtained according to the above procedure, 40 grams of xylene and one gram benzoyl peroxide were stirred and heated at reflux for fifteen hours, reflux temperature being 105° C. The reaction product formed a clear, tacky film which became tack-free after standing for 24 hours.

Example IV

Crystallized, ketonized castor oil obtained according to the oxidation procedure of Example III was bodied by heat at 165° C. for five hours. The orange-colored, bodied oil obtained had a viscosity of ten poises at 25° C., an acid number of 7.41, a refractive index at 27.5° C. of 1.4808, and 81.3 percent of the theoretical number of keto groups for glycerol tri-12-keto-10-octadecenoate.

20 grams of redistilled styrene, 20 grams of bodied ketonized castor oil obtained according to the above procedure, 40 grams of xylene and 1 gram benzoyl peroxide were stirred and heated at a reflux temperature for sixteen hours, the reflux temperature being 105° C. All of the styrene had reacted with the oil at the end of the reflux period. The reaction product formed a clear, tacky film which became tack-free after standing for 24 hours.

The presence of a drying catalyst in the styrenated oils prepared according to the above examples results in a substantial shortening of the time required for drying to a tack-free state.

*Example V*

0.17 percent by weight lead naphthenate, 0.035 percent by weight cobalt naphthenate, and 0.07 percent by weight zinc naphthenate were added to a solution of five grams of each of the styrenated oils prepared according to Examples I, II, III, and IV in ten cc. of xylene. The solutions of the oils containing the naphthenates formed clear films which became tack-free in 5.5, 8, 6.5, and 3 hours respectively.

Since certain features in connection with the above process for the styrenation of ketonized castor oils may be varied without departing from the scope of the invention, it is intended that all material contained in the description is to be interpreted as illustrative and not by way of limitation.

This application is a continuation-in-part of my application Serial No. 443,165, filed July 13, 1954.

What is claimed is:

1. A styrenated oil in which the oil is a glyceride selected from the class consisting of glycerides of 12-keto-oleic acid, glycerides of 12-keto-10-octadecenoic acid, and mixtures thereof.

2. A styrenated oil in which the oil is composed of glycerides of 12-keto-oleic acid.

3. A styrenated oil in which the oil is composed of glycerides of 12-keto-10-octadecenoic acid.

4. A styrenated oil in which the oil is a mixture of glycerides of 12-keto-oleic acid and 12-keto-10-octadecenoic acid.

5. A styrenated oil in which the oil is a glyceride selected from the class consisting of glycerides of 12-keto-oleic acid, glycerides of 12-keto-10-octadecenoic acid, and mixtures thereof, approximately equal weights of styrene and oil having been used in the preparation of the styrenated oil.

6. A styrenated oil in which the oil is glycerides of 12-keto-oleic acid, approximately equal weights of styrene and oil having been used in the preparation of the styrenated oil.

7. A styrenated oil in which the oil is glycerides of 12-keto-10-octadecenoic acid, approximately equal weights of styrene and oil having been used in the preparation of the styrenated oil.

8. A styrenated oil in which the oil is a mixture of glycerides of 12-keto-oleic acid and 12-keto-10-octadecenoic acid, approximately equal weights of styrene and oil having been used in the preparation of the styrenated oil.

9. A bodied, styrenated oil in which the oil comprises a glyceride selected from the class consisting of glycerides of 12-keto-oleic acid, glycerides of 12-keto-10-octadecenoic acid, and mixtures thereof.

10. A bodied, styrenated oil in which the oil comprises glycerides of 12-keto-oleic acid.

11. A bodied, styrenated oil in which the oil comprises glycerides of 12-keto-10-octadecenoic acid.

12. A bodied, styrenated oil in which the oil comprises a mixture of glycerides of 12-keto-oleic acid and 12-keto-10-octadecenoic acid.

References Cited in the file of this patent

UNITED STATES PATENTS

| | | |
|---|---|---|
| 2,190,915 | Bass et al. | Feb. 20, 1940 |
| 2,567,137 | Wakeford et al. | Sept. 4, 1951 |
| 2,623,888 | Nichlos | Dec. 30, 1952 |

OTHER REFERENCES

Schroeder et al.: J. Am. Oil Chem. Soc., April 1949, pages 153–156.